(12) United States Patent
Wang et al.

(10) Patent No.: US 10,983,376 B2
(45) Date of Patent: Apr. 20, 2021

(54) MEASURING DEVICE AND A MEASURING SYSTEM

(71) Applicants: BOE Technology Group Co., Ltd., Beijing (CN); Ordos Yuansheng Optoelectronics Co., Ltd., Inner Mongolia (CN)

(72) Inventors: Dong Wang, Beijing (CN); Wenlong Zhao, Beijing (CN); Huan Tang, Beijing (CN); Xiaoqiang Cui, Beijing (CN); Haiyan Xu, Beijing (CN); Hyunjin Kim, Beijing (CN); Zhao Wang, Beijing (CN)

(73) Assignees: BOE Technology Group Co., Ltd., Beijing (CN); Ordos Yuansheng Optoelectronics Co., Ltd., Inner Mongolia (CN)

( * ) Notice: Subject to any disclaimer, the term of this patent is extended or adjusted under 35 U.S.C. 154(b) by 352 days.

(21) Appl. No.: 16/095,818

(22) PCT Filed: Apr. 9, 2018

(86) PCT No.: PCT/CN2018/082236
§ 371 (c)(1),
(2) Date: Oct. 23, 2018

(87) PCT Pub. No.: WO2018/233348
PCT Pub. Date: Dec. 27, 2018

(65) Prior Publication Data
US 2020/0341304 A1    Oct. 29, 2020

(30) Foreign Application Priority Data

Jun. 20, 2017 (CN) .......................... 201720723557.7

(51) Int. Cl.
*G02F 1/13* (2006.01)
*G02F 1/1345* (2006.01)
*G02F 1/35* (2006.01)

(52) U.S. Cl.
CPC ........ *G02F 1/1309* (2013.01); *G02F 1/13458* (2013.01); *G02F 1/3505* (2021.01)

(58) Field of Classification Search
None
See application file for complete search history.

(56) References Cited

FOREIGN PATENT DOCUMENTS

| CN | 103424065 | 12/2013 |
|----|-----------|---------|
| CN | 103676240 | 3/2014  |

(Continued)

OTHER PUBLICATIONS

International Search Report and Written Opinion of the International Searching Authority corresponding to International Patent Application No. PCT/CN2018/082236, dated Jun. 27, 2018. (15 pages with English translation).

*Primary Examiner* — Ashok Patel
(74) *Attorney, Agent, or Firm* — Myers Bigel, P.A.

(57) ABSTRACT

A measuring device includes a housing and a power source, a conductive detecting unit arranged in the housing and connected with the power source, a carrier facing the conductive detecting unit, connection terminals arranged on the carrier and connected with the power source, and a lifting mechanism configured to control the conductive detecting unit and the carrier to move relatively in the first direction. wherein the The carrying surface of the carrier is parallel to the main surface of the conductive detecting unit, and the first direction is a direction perpendicular to the carrying surface.

20 Claims, 4 Drawing Sheets

(56) References Cited

FOREIGN PATENT DOCUMENTS

| | | |
|---|---|---|
| CN | 106057503 | 10/2016 |
| CN | 206788515 | 12/2017 |
| JP | 2007163296 | 6/2007 |
| KR | 20110022108 | 3/2011 |

MEASURING DEVICE AND A MEASURING SYSTEM

CROSS REFERENCE TO RELATED APPLICATIONS

The present application is a 35 U.S.C. 371 national stage application of PCT International Application No. PCT/CN2018/082236, filed on Apr. 9, 2018, which claims the benefit of Chinese patent application No. 201720723557.7, filed on Jun. 20, 2017, the contents of which are incorporated herein by reference in their entireties.

BACKGROUND

The present disclosure relates to the technical field of display, in particular to a measuring device and a measuring system of a display substrate.

Liquid crystal display (LCD) is widely used because of its light and thin body, low power consumption, no radiation and long service life.

Since the thickness of the liquid crystal layer has a great influence on the response speed, contrast and visual angle of the LCD, usually the person skilled in the art adjusts the thickness of the liquid crystal layer inside the LCD by arranging spacers between the two aligned substrates. The heights of the spacers have direct influence on the thickness of the liquid crystal layer. Therefore, the height is one of the important measurement parameters in the research and analysis of the spacers.

At present, the measuring method of spacer height is mainly optical method, which has the advantages of high measuring accuracy, but at the same time there are also some problems such as low measuring efficiency and complicated measuring equipment. Especially for high-resolution display products, the number of internal spacers is large, and the distribution of the overall spacer height represented by the measured height data of limited number of spacers obviously has error. As a result, it is difficult to obtain accurate analysis results when analyzing the correlation between LCD abnormalities and the height of spacers, which makes it more difficult and takes longer to analyze the causes of LCD defects.

SUMMARY

In view of this, a first aspect of the present disclosure provides a measuring device comprising: a housing and a power source; a conductive detecting unit arranged in the housing and connected with the power source; a carrier facing the conductive detecting unit; connection terminals arranged on the carrier and connected with the power source; and a lifting mechanism configured to control the conductive detecting unit and the carrier to move relatively in a first direction; wherein the carrying surface of the carrier is parallel to the working surface of the conductive detecting unit, and the first direction is a direction perpendicular to the carrying surface.

According to one aspect of the present disclosure, the lifting mechanism drives the conductive detecting unit to move in the first direction.

According to one aspect of the present disclosure, the lifting mechanism is arranged on the inner wall of the housing facing the carrier, and the conductive detecting unit is arranged on the side of the lifting mechanism facing the carrier.

According to one aspect of the present disclosure, the conductive detecting unit comprises a substrate and a plurality of conductive sheets arranged on the surface of the substrate, and the plurality of conductive sheets are connected to the power source in parallel.

Optionally, the conductive sheet is polygonal, and the longest connecting line between vertices of the polygon is 0.5~1 mm.

Optionally, the conductive sheet is circular, and the diameter of the circular shape is 0.5~1 mm.

According to one aspect of the present disclosure, the plurality of the conductive sheets are arranged in an array.

According to one aspect of the present disclosure, the thickness of the conductive sheet is 0.001~1 mm.

According to one aspect of the present disclosure, the power source is disposed inside the housing.

According to one aspect of the present disclosure, the housing is made of insulating material.

According to one aspect of the present disclosure, the orthographic projection of the housing on the carrying surface of the carrier is rectangular.

An embodiment of the present disclosure also provides a measuring system comprising the above described measuring device, and a display substrate provided with spacers; wherein the display substrate is placed on the carrying surface of the measuring device, and the upper surface of the display substrate is covered with a layer of conductive film.

According to one aspect of the present disclosure, the thickness of the conductive film is 0.001~1 mm.

BRIEF DESCRIPTION OF THE DRAWINGS

In order to more clearly explain the technical solution of the embodiments of the present disclosure, the following will briefly introduce the drawings that need to be used in the embodiments of the present disclosure. Obviously, the drawings in the following description are only some embodiments of the present disclosure. For those of ordinary skill in the art, other drawings can be obtained based on these drawings without creative effort.

DETAILED DESCRIPTION

The technical solution in the embodiment of the present disclosure will be described clearly and completely below with reference to the attached drawings in the embodiments of the present disclosure. Obviously, the described embodiment is only a part of the embodiments of the present disclosure and not all of the embodiments. Based on the embodiments in this disclosure, all other embodiments obtained by those of ordinary skill in the art without creative effort are within the protection scope of this disclosure.

Figure 1:
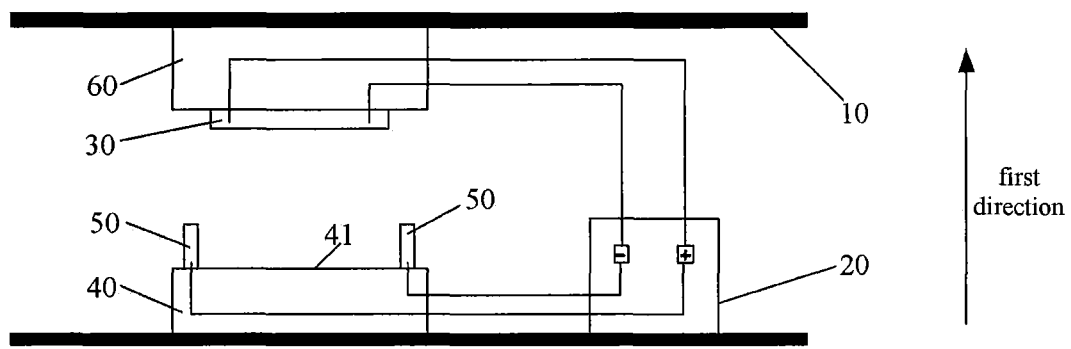
FIG. 1 is a first schematic structural view of a measuring device provided by an embodiment of the disclosure.

The embodiment of the present disclosure provides a measuring device, as shown in FIG. 1, comprising a housing 10, a power source 20, a conductive detecting unit 30 arranged in the housing 10 and connected with the power source 20, a carrier 40 facing the conductive detecting unit 30, connection terminals 50 arranged on the carrier 40 and connected with the power source 20, and a lifting mechanism 60 controlling the conductive detecting unit 30 and the carrier 40 to move relatively in a first direction. Wherein, the carrying surface 41 of the carrier 40 is parallel to the main surface (i.e., the lower surface in FIG. 1) or the working surface of the conductive detecting unit 30, and the first direction is a direction perpendicular to the carrying surface 41.

It should be noted that firstly, the carrier 40 is facing the conductive detecting unit 30, that is, the orthographic projection of the conductive detecting unit 30 on the plane where the carrier 40 is located falls on the carrier 40. In terms of the positional relationship between the conductive detecting unit 30 and the carrier 40 in FIG. 1, the conductive detecting unit 30 is disposed directly above the carrier 40.

Secondly, the power source 20, as shown in FIG. 1, can be disposed inside the housing 10. It can also be arranged outside the housing 10. FIG. 1 is only schematic and is not intended to be limiting.

Thirdly, the conductive detecting unit 30 and the carrier 40 move relatively in the first direction. That is, the conductive detecting unit 30 may move in the first direction while the carrier 40 remains stationary. Alternatively, the carrier 40 may move in the first direction while the conductive detecting unit 30 remains stationary. Of course, it is also possible that both the conductive detecting unit 30 and the carrier 40 move.

Figure 2:
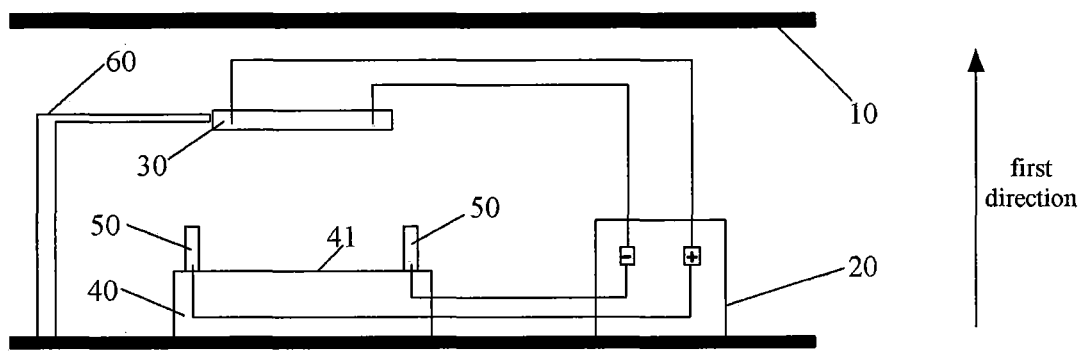
FIG. 2 is a second schematic structural view of a measuring device provided by an embodiment of the present disclosure.

The setting position of the lifting mechanism 60 is not limited. Taking the lifting mechanism 60 driving the conductive detecting unit 30 to move in the first direction as an example, as shown in FIG. 1, the lifting mechanism 60 can be fixed on the inner wall of the housing 10 facing the carrier 40 (the upper wall of the housing 10 in FIG. 1) to drive the conductive detecting unit 30 to move in the first direction. Alternatively, as shown in FIG. 2, it can be arranged on the inner wall of the housing 10 (the lower wall of the housing 10 in FIG. 1) where the carrier 40 is located to drive the conductive detecting unit 30 to move in the first direction. Of course, it is also possible to have other setting positions that can drive the conductive detecting unit 30 to move in the first direction.

In addition, the specific structure of the lifting mechanism 60 is not limited, and a structure having a telescopic function or a structure capable of driving the conductive detecting unit 30 to move in prior art can be used.

Fourthly, the carrier 40 may be, for example, a structure provided in the housing 10. The inner wall of the housing 10 can also be directly used as the carrier, and the surface of the inner wall is the carrying surface at this time. It is sufficient to ensure that the carrying surface 41 is parallel to the main surface of the conductive detecting unit 30.

Wherein, the connection terminals 50 are arranged on the carrier 40, and the material of the carrier 40 is an insulating material.

Fifthly, the carrying surface 41 of the carrier 40 is parallel to is the main surface of the conductive detecting unit 30, and the display substrate to be detected is placed on the carrying surface 41 and then energized, and the conductive detecting unit 30 is also energized to adjust the voltage to a required test voltage. At this time, capacitance can be formed between the display substrate to be detected and the conductive detecting unit 30.

Sixthly, those skilled in the art should understand that the connection terminals 50 here should include positive and negative terminals respectively. For simplicity, no distinction is made in FIGS. 1 and 2.

Figure 7:
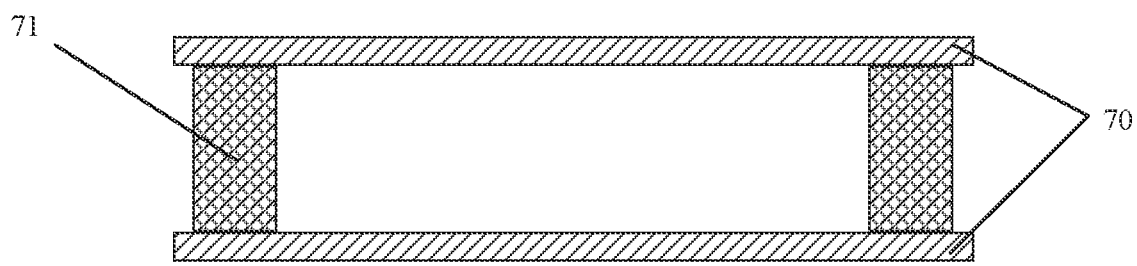
FIG. 7 is a schematic enlarged sectional view of a display substrate of a measuring system provided by an embodiment of the disclosure.

According to the measuring device provided by the embodiment of the disclosure in FIG. 7, the height of each spacer 71 is quickly and accurately measured by utilizing the capacitance induction principle, so that the average value of different regions on the display substrate to be measured is obtained, and the problems of low efficiency in measuring the height of the spacer 71 by an optical method and limited number of measured data samples are solved. By measuring the distribution of the spacer height through the measuring device provided by the embodiment of the present disclosure, the correlation between the display substrate abnormalities and the spacer height can be accurately confirmed, thereby shortening the analysis time of the display substrate defect, enhancing the efficiency of the yield improvement.

According to one aspect of the present disclosure, as shown in FIGS. 1 and 2, the lifting mechanism 60 drives the conductive detecting unit 30 to move up and down in the first direction.

According to the present disclosure, the lifting mechanism 60 drives the conductive detecting unit 30 to move without manually adjusting the height of the carrier 40, thereby ensuring the stability of the carrier 40 and improving the accuracy of measurement results.

According to one aspect of the present disclosure, as shown in FIG. 1, the lifting mechanism 60 is disposed on the inner wall of the housing 10 facing the carrier 40, and the conductive detecting unit 30 is disposed on the side of the lifting mechanism 60 facing the carrier 40.

That is, the base of the lifting mechanism 60 is fixed to the inner wall of the housing 10 and its lifting member can move up and down relative to the inner wall of the housing 10, and the conductive detecting unit 30 is fixed to the lifting member of the lifting mechanism 60 to move up and down accordingly. The conductive detecting unit 30 is facing the carrying surface 41 of the carrier 40, and there is no other structure between the conductive detecting unit 30 and the carrying surface 41 of the carrier 40.

Of course, as shown in FIG. 2, the base of the lifting mechanism 60 can also be arranged on the inner wall of the side of the housing 10 where the carrier 40 is located, and is connected to the conductive detecting unit 30 through an L-shaped telescopic rod, an L-shaped transmission chain, or an L-shaped sliding rail. Other aspects are similar to those of FIG. 1.

The embodiment of the present disclosure is simple in structure and high in stability by arranging the lifting mechanism 60 directly on the inner wall of the housing 10.

Figure 3:
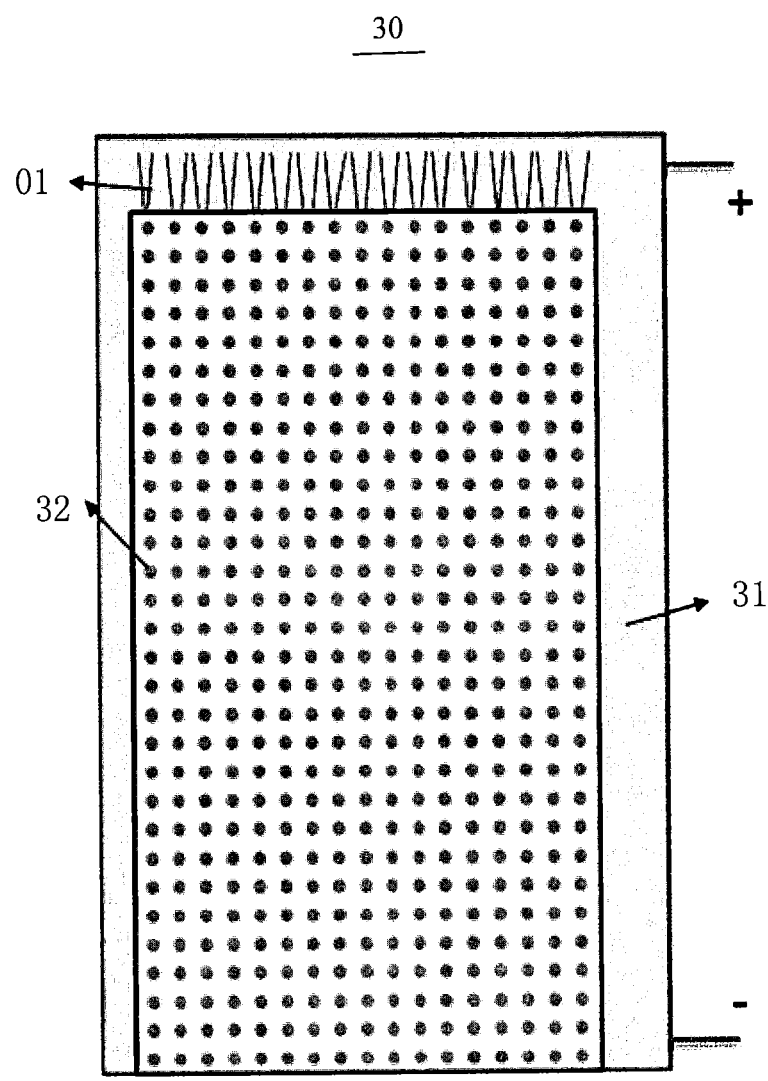
FIG. 3 is a schematic top view of a conductive detecting unit provided by an embodiment of the present disclosure.
Figure 4:
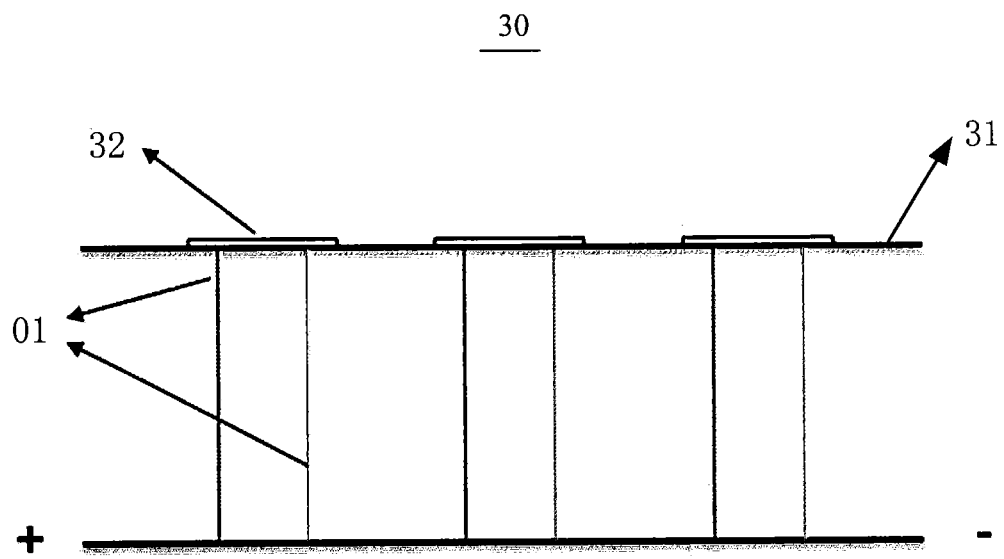
FIG. 4 is a schematic side view of a conductive detecting unit provided by an embodiment of the present disclosure.

According to one aspect of the present disclosure, as shown in FIGS. 3 and 4, the conductive detecting unit 30 includes a substrate 31 and a plurality of conductive sheets 32 disposed on the surface of the substrate 31, and the plurality of conductive sheets 32 are connected to the power source 20 in parallel.

The arrangement of the conductive sheets 32 is not limited. Alternatively, the conductive sheets 32 are arranged as closely as possible, but the conductive sheets 32 are not in contact with each other. The material of the conductive sheet 32 may be, for example, metal. The conductive sheets 32 are connected to the power source 20 through conductive wires 01.

According to the embodiment of the present disclosure, the conductive detecting unit 30 includes a plurality of conductive sheets 32 separated from each other and connected in parallel. Therefore, through each conductive sheet 32, the heights of the corresponding spacers (including the main spacer and the auxiliary spacer) can be measured and the measured heights are integrated into center coordinates of the position of each conductive sheet 32, so that the height distribution map of the main spacers and the auxiliary spacers of the entire display substrate to be detected can be formed, and thus the influence of each spacer on the display effect can be quickly determined.

Optionally, the conductive sheet is polygonal, and the longest connecting line between vertices of the polygon is 0.5~1 mm. Alternatively, the conductive sheet is circular, and the diameter of the circular shape is 0.5~1 mm. This arrangement facilitates the matching of the conductive sheets with the arrangement pattern of spacers on the display substrate.

According to one aspect of the present disclosure, as shown in FIG. 3, a plurality of conductive sheets 32 are arranged in an array.

According to the embodiment of the present disclosure, the conductive sheets 32 are arranged in an array, so that the number of spacers detected by each conductive sheet 32 is the same, and the uniformity of detection results can be improved.

According to one aspect of the present disclosure, the thickness of the conductive sheet 32 is 0.001~1 mm.

By setting the thickness of the conductive sheet 32 to 0.001~1 mm in the embodiment of the present disclosure, it is possible to prevent the conductive sheet 32 from being too thin to cause excessive resistance or the conductive sheet 32 from being too thick to cause inaccurate detection results.

In order to prolong the service life of the power source 20, optionally, as shown in FIGS. 1 and 2, the power source 20 is disposed inside the housing 10.

In order to avoid interference of the housing 10 with the detection results, the housing 10 is optionally an insulating material.

Based on the above, in order to simplify the structure of the measuring device, optionally, the orthographic projection of the housing 10 on the carrying surface 41 of the carrier 40 is rectangular.

Figure 5:
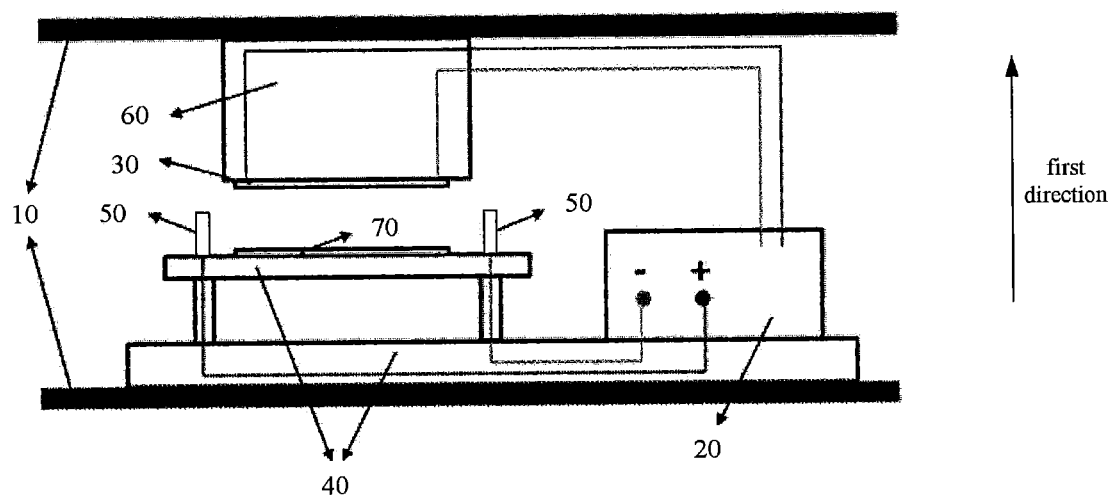
FIG. 5 is a schematic structural view of a measuring system provided by an embodiment of the disclosure.

The embodiment of the present disclosure also provides a measuring system, as shown in FIG. 5, including the measuring device and the display substrate 70 provided with spacers. The display substrate 70 is placed on the carrying surface 41 of the measuring device, and the upper surface of the display substrate 70 is covered with a conductive film. Wherein the surface of the display substrate 70 covered with the conductive film is away from the carrying surface 41.

It should be noted that firstly, after the display substrate 70 is placed on the carrying surface 41 of the measuring device, the display substrate 70 is facing the conductive detecting unit 30.

Wherein, the display substrate 70 may be, for example, a color film substrate.

Secondly, the upper surface of the display substrate 70 refers to the surface of the display substrate 70 on which the spacers are disposed, that is, the spacers are remote from surface of the back of the display substrate 70. The surface of the spacer is coated with a conductive film.

Thirdly, a person skilled in the art should understand that when measuring the display substrate 70, the surface of the display substrate 70 covered with the conductive film should face the conductive detecting unit 30.

Fourthly, the measuring method of the measuring system is for example, as follows:

S10. Controlling the lifting mechanism 60 to move up and down by a computer so that the lifting mechanism 60 drives the conductive detecting unit 30 to move to an initial position.

S20. Placing the display substrate 70 coated with the conductive film layer on the carrying surface 41 and connecting to the positive and negative connection terminals 50 on the carrier 40.

S30. Turning on the power source 20, adjusting the voltage to a required measurement voltage, and adjusting the lifting mechanism 60 so that the distance between the conductive detecting unit 30 and the display substrate 70 reaches a predetermined value.

S40. Measuring the capacitance value between the conductive detecting unit 30 and the display substrate 70 using capacitance induction principle.

S50: if it is necessary to continue the measurement, repeating steps S30 and S40; if it is not necessary to continue the measurement, end the measurement.

S60, data processing.

Wherein, the data processing steps are as follows:

According to the calculation formula of parallel capacitor plates:

$$D = \varepsilon_0 \varepsilon_\gamma \frac{S}{C} \quad \text{(formula 1)}$$

Where D is the effective distance between the working surface of the conductive detecting unit 30 (the lower surface of the conductive detecting unit 30 in FIG. 5) and the display substrate 70, $\varepsilon_0$ is the vacuum dielectric constant, and $\varepsilon_y$ is the relative dielectric constant; S is the effective area of the plate capacitor formed by the conductive detecting unit 30 and the display substrate 70, and C is the measured capacitance value.

Figure 6:
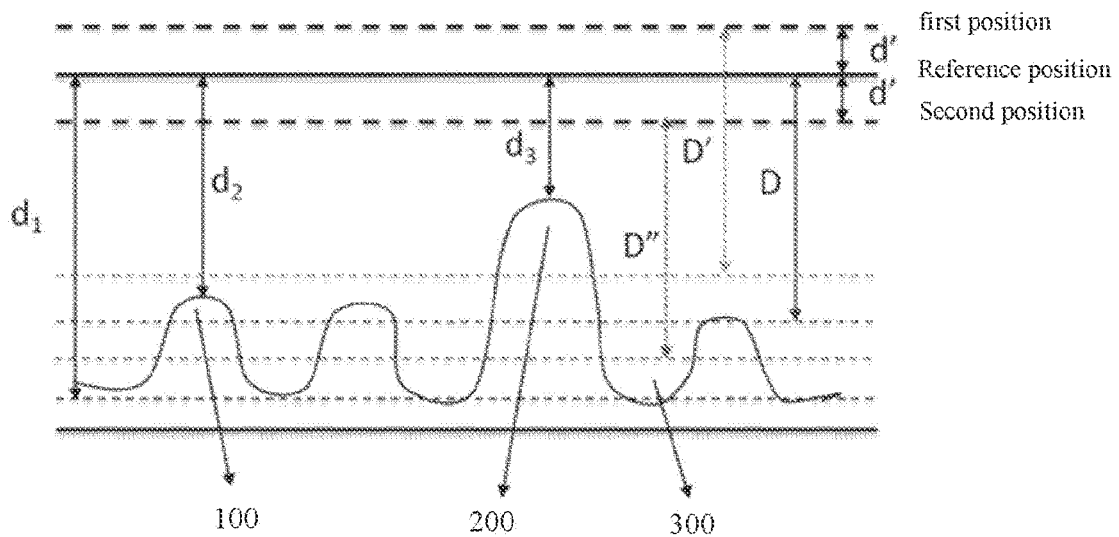
FIG. 6 is a schematic view of a measuring process of a measuring system provided by an embodiment of the disclosure.

As shown in FIG. 6, $d_1$ is the distance between the working surface of the conductive detecting unit 30 and the upper surface 300 of the display substrate 70, and $d_2$ is the distance between the working surface of the conductive detecting unit 30 and the top plane 100 of the auxiliary spacers; $d_3$ is the distance between the working surface of the conductive detecting unit 30 and the top plane 200 of the main spacers; D is the preset effective distance between the working surface of the conductive detecting unit 30 and the display substrate 70. According to the design of the product spacer, the area ratios of the substrate plane 300, the top plane 100 of the auxiliary spacer, and the top plane 200 of the main spacer are $S_1$, $S_2$, and $S_3$, respectively. From formula 1, the following formula can be obtained:

$$1/D = S_1/d_1 + S_2/d_2 + S_3/d_3 \quad \text{(formula 2)}$$

As shown in FIG. 6, the lifting mechanism 60 is adjusted to a reference position, a first position and a second position in sequence, the capacitance between the conductive detecting unit 30 and the display substrate 70 is measured, and is converted into effective distances D, D' and D". From formula 2, the following formula can be obtained:

$$1/D = S_1/d_1 + S_2/d_2 + S_3/d_3 \quad \text{(formula 3)}$$

$$1/D' = S_1/(d_1+d') + S_2/(d_2+d') + S_3/(d_3+d') \quad \text{(formula 4)}$$

$$1/D'' = S_1/(d_1-d') + S_2/(d_2-d') + S_3/(d_3-d') \quad \text{(formula 5)}$$

Wherein, D, D' and D", as well as $S_1$, $S_2$ and $S_3$, and d' are all known parameters, and several groups of solutions of $d_1$, $d_2$, and $d_3$ can be obtained through calculation of (formula 3), (formula 4), and (formula 5) by data processing software Matlab.

The above solutions are selected and rejected through the design file of the display substrate 70; The accurate values of $d_1$, $d_2$ and $d_3$ can be obtained.

$$\text{Main spacer height} = d_1 - d_3 \quad \text{(formula 6)}$$

$$\text{Auxiliary spacer height} = d_1 - d_2 \quad \text{(formula 7)}$$

The height values of the main spacers and auxiliary spacers are calculated by (formula 6) and (formula 7).

wherein, when the conductive detecting unit 30 includes a plurality of conductive sheets 32, the height values of the main spacers and auxiliary spacers corresponding to each conductive sheet 32 are respectively calculated and integrated into the center coordinates of the positions of the conductive sheets 32, so that the height distribution maps of the main spacers and auxiliary spacers of the entire display substrate 70 can be formed and output in Excel file format.

The embodiment of the present disclosure provides a measuring system, which can quickly and accurately measure the height of each spacer by using capacitance induction principle, thereby obtaining an average value of different regions on the display substrate to be measured, and solve the problems of low efficiency in measuring the heights of the spacers by an optical method and poor representativeness of measured data. The distribution of the spacer heights measured by the measuring system provided by the embodiment of the present disclosure can accurately confirm the correlation between the abnormalities of the display substrate 70 and the spacer heights, thus shortening the analysis time of the display substrate defects and enhancing the efficiency of the yield improvement.

According to one aspect of the present disclosure, the thickness of the conductive film is 0.001~1 mm.

That is, before measuring the display substrate 70, a conductive film having a thickness of 0.001~1 mm, for example, a metal film, may be vapor deposited on the upper surface of the display substrate 70.

By setting the thickness of the conductive sheet 32 to 0.001~1 mm in the embodiment of the present disclosure, it is possible to prevent the conductive sheet 32 from being too thin to cause excessive resistance or the conductive sheet 32 from being too thick to cause inaccurate detection results.

The measuring device and the measuring system provided by the embodiment of the present disclosure can quickly and accurately measure the heights of the spacers by using capacitance induction principle, thus obtaining the average value of different regions on the display substrate to be measured, and solve the problems of low efficiency in measuring the heights of the spacers by an optical method and poor representativeness of measured data. The distribution of the spacer heights measured by the measuring device provided by the embodiment of the present disclosure can accurately confirm the correlation between the display substrate abnormalities and the spacer height, thereby shortening the analysis time of the display substrate defects and enhancing the efficiency of the yield improvement. The measuring device and the measuring system provided by the embodiment of the present disclosure can solve the problem that the obtained height distribution of the spacers has obvious errors due to the small sampling amount.

The above description is only a specific embodiment of the present disclosure, but the protection scope of the present disclosure is not limited to this. Any changes or substitutions that can easily occur to those skilled in the art within the technical scope of the present disclosure should be included within the protection scope of the present disclosure. Therefore, the protection scope of the present disclosure should be subject to the protection scope of the claims.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the disclosure described herein are capable of operation in other sequences than described or illustrated herein.

The system, apparatus and devices herein are amongst others described during operation. As will be clear to the person skilled in the art, the disclosure is not limited to methods of operation or devices in operation.

It should be noted that the above-mentioned embodiments illustrate rather than limit the disclosure, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The disclosure may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The disclosure further applies to a device comprising one or more of the characterizing features described in the description and/or shown in the attached drawings. The disclosure further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A measuring device comprising:
    a housing and a power source;
    a conductive detecting unit in the housing and connected with the power source;
    a carrier facing the conductive detecting unit;
    connection terminals on the carrier and connected with the power source; and
    a lifting mechanism configured to control the conductive detecting unit and the carrier to move in a first direction,
    wherein a carrying surface of the carrier is parallel to a working surface of the conductive detecting unit, and
    wherein the first direction is a direction perpendicular to the carrying surface.

2. The measuring device according to claim 1, wherein the lifting mechanism is configured to drive the conductive detecting unit to move in the first direction.

3. The measuring device according to claim 2, wherein the lifting mechanism is on an inner wall of the housing facing the carrier, and
    wherein the conductive detecting unit is on a side of the lifting mechanism facing the carrier.

4. The measuring device according to claim 1,
    wherein the conductive detecting unit comprises a substrate and a plurality of conductive sheets on a surface of the substrate, and
    wherein the plurality of conductive sheets are connected to the power source in parallel.

5. The measuring device according to claim 4,
    wherein each of the conductive sheets comprises a polygonal shape, and a longest connecting line between vertices of the polygonal shape is in a range 0.5 mm to 1 mm; or
    wherein each of the conductive sheets comprises a circular shape, and a diameter of the circular shape is in a range 0.5 mm to 1 mm.

6. The measuring device according to claim 4, wherein the plurality of the conductive sheets are arranged in an array.

7. The measuring device according to claim 4, wherein a thickness of each of the conductive sheets is in a range 0.001 mm to 1 mm.

8. The measuring device according to claim 1, wherein the power source is inside the housing.

9. The measuring device according to claim 1, wherein the housing comprises an insulating material.

10. The measuring device according to claim 1, wherein an orthographic projection of the housing on the carrying surface of the carrier is a rectangular shape.

11. A measuring system comprising a measuring device and a display substrate provided with spacers, wherein the measuring device comprises:
    a housing and a power source;
    a conductive detecting unit arranged in the housing and connected with the power source;
    a carrier facing the conductive detecting unit;
    connection terminals on the carrier and connected with the power source; and
    a lifting mechanism configured to control the conductive detecting unit and the carrier to move in a first direction,
    wherein a carrying surface of the carrier is parallel to a working surface of the conductive detecting unit,
    wherein the first direction is a direction perpendicular to the carrying surface,
    wherein the display substrate is on the carrying surface of the measuring device, and
    wherein an upper surface of the display substrate is covered with a layer of conductive film.

12. The measuring system according to claim 11, wherein a thickness of the conductive film is in a range 0.001 mm to 1 mm.

13. The measuring system according to claim 11, wherein the lifting mechanism is configured to drive the conductive detecting unit to move in the first direction.

14. The measuring system according to claim 13, wherein the lifting mechanism is on an inner wall of the housing facing the carrier, and the conductive detecting unit is on a side of the lifting mechanism facing the carrier.

15. The measuring system according to claim 11,
    wherein the conductive detecting unit comprises a substrate and a plurality of conductive sheets arranged on a surface of the substrate, and
    wherein the plurality of conductive sheets are connected to the power source in parallel.

16. The measuring system according to claim 15,
    wherein each of the conductive sheets comprises a polygon, and a longest connecting line between vertices of the polygon is in a range 0.5 mm to 1 mm, or each of the conductive sheets is a circle, and a diameter of the circle is in a range 0.5 mm to 1 mm.

17. The measuring system according to claim 15, wherein the plurality of the conductive sheets are arranged in an array.

18. The measuring system according to claim 15, wherein a thickness of each of the conductive sheets is in a range 0.001 mm to 1 mm.

19. The measuring system according to claim 11, wherein the power source is inside the housing.

20. The measuring system according to claim 11, wherein the housing comprises an insulating material.

* * * * *